(12) United States Patent
Schuech et al.

(10) Patent No.: US 8,511,962 B2
(45) Date of Patent: Aug. 20, 2013

(54) CONNECTING MEMBER

(75) Inventors: Andrea Schuech, Schwaebisch Gmuend (DE); Peter Haas, Eschach (DE)

(73) Assignee: TRW Automotive GmbH, Alfdorf (DE)

( * ) Notice: Subject to any disclaimer, the term of this patent is extended or adjusted under 35 U.S.C. 154(b) by 375 days.

(21) Appl. No.: 12/484,424

(22) Filed: Jun. 15, 2009

(65) Prior Publication Data

US 2009/0324360 A1    Dec. 31, 2009

(30) Foreign Application Priority Data

Jun. 25, 2008  (DE) .......................... 10 2008 030 048

(51) Int. Cl.
*F16B 19/00*    (2006.01)

(52) U.S. Cl.
USPC ........... 411/510; 411/388; 411/389; 411/411; 411/414; 411/424

(58) Field of Classification Search
USPC ................. 411/388, 389, 411, 424, 507, 509, 411/510, 414
See application file for complete search history.

(56) References Cited

U.S. PATENT DOCUMENTS

| 133,191 | A | * | 11/1872 | Bigelow | 411/455 |
|---|---|---|---|---|---|
| D31,749 | S | * | 10/1899 | North | D8/387 |
| 1,082,945 | A | * | 12/1913 | Graham | 411/389 |
| 2,298,203 | A | * | 10/1942 | Eklund | 411/510 |
| 3,455,198 | A | * | 7/1969 | Barrett | 411/388 |
| 3,494,244 | A | * | 2/1970 | Wayland | 411/510 |
| 3,829,824 | A | * | 8/1974 | Pillischafske | 439/758 |
| 4,194,272 | A | * | 3/1980 | Taffurelli | 24/114.7 |
| 4,454,699 | A | * | 6/1984 | Strobl | 52/585.1 |
| 4,577,378 | A | * | 3/1986 | Harenberg | 24/635 |
| 4,976,715 | A | * | 12/1990 | Bays et al. | 606/77 |
| 5,019,079 | A | * | 5/1991 | Ross | 606/312 |
| 5,061,135 | A | * | 10/1991 | Pritchard | 411/411 |
| 5,217,339 | A | * | 6/1993 | O'Connor et al. | 411/531 |
| 5,685,682 | A | * | 11/1997 | Glime et al. | 411/510 |
| 6,176,662 | B1 | * | 1/2001 | Champney et al. | 411/171 |
| 6,442,806 | B1 | * | 9/2002 | Wesson | 24/573.11 |
| 2007/0147975 | A1 | * | 6/2007 | Homner | 411/510 |

* cited by examiner

*Primary Examiner* — Roberta Delisle

(74) *Attorney, Agent, or Firm* — Tarolli, Sundheim, Covell & Tummino LLP

(57) ABSTRACT

A connecting member for two parts includes a first half (2) and a second half (3) meeting at a center (M) of the connecting member (1). The first half (2) includes a first number of ramp portions (41-45) widening toward center (M) in an axial direction (X) thereof. The second half (3) includes a second number of ramp portions (51-55) widening toward center (M) in an axial direction (X) thereof so that the first half (2) and the second half (3) have opposite toothing.

19 Claims, 3 Drawing Sheets

CONNECTING MEMBER

FIELD OF THE INVENTION

The present invention relates to a connecting member for parts, in particular for plastic parts of a seat belt buckle, and to a method of connecting two parts by means of a connecting member.

BACKGROUND OF THE INVENTION

A wide variety of connecting techniques is used for connecting two parts, for instance two shells of a plastic housing. Techniques known in the art include, for instance, ultrasound techniques or friction welding methods. These methods, however, are relatively complex and require considerable technology and equipment for producing the desired connection.

SUMMARY OF THE INVENTION

It is an object of the present invention to provide a simplified connection for two parts to be connected.

The present invention provides a connecting member for parts, in particular plastic parts, allowing for simple and secure mounting of two parts. To this end, the connecting member comprises a first half and a second half meeting at a center of the connecting member. In an axial direction thereof, the first half comprises a first number of ramp portions widening toward the center. The second half comprises a second number of ramp portions widening toward the center. Thus, the first and the second half exhibit an opposite toothing. Insertion of the connecting member into recesses of the parts permits a simple but secure connection. Preferably, the recesses are positioned so as to enable insertion of the connecting member on one side into a recess of one part and, on the other side, its insertion into a corresponding recess of the other part. The connection is established by pressing the parts together and, in an ideal case, it cannot be released again without destroying the connecting member. For this purpose, the ramp portions are formed so as to widen toward the center, i.e. toward the area where the two halves of the connecting member meet. Simultaneously, the center of the connecting member may, in a connection established by means thereof, advantageously be located at that point where the two parts to be connected by means of the connecting member meet. In the context of the present invention, the center of the connecting member does not refer to an exact geometrical center relative to the ends of the connecting member but rather to the area where the two halves meet. Hence, the two halves do not have to be of the same length. The opposite toothing provided by the ramp portions produces a retention force holding the parts to be connected together. The adjoining ramp portions are separate from each other, i.e. they do not represent a winding.

The ramp portions of both halves may generally be formed identically, in particular they may be mirror-symmetrical relative to the center. In this case, an outer diameter of the first half is of the same size as a corresponding outer diameter of the second half. However, so as to take account of the different demands made on the connection and the different properties of the parts to be connected, the ramp portions of the two halves may also advantageously widen to a different extent. This is to say that the diameter of the first half may, for instance, be larger than the diameter of the second half of the connecting member. Both halves may have the same length in the axial direction, but may advantageously also be of different lengths.

The cross-sectional surface of the first or the second half of the connecting member may be rectangular or round, in particular circular.

In the case of a circular embodiment, the connecting member as a whole may be pin-shaped and may extend in the axial direction, for instance, in the shape of a cone including the inventive barb-like ramp portions.

Preferably, either the first or the second half or both halves include a conical free end. This free end is conically chamfered to allow it to be more easily inserted or pressed into the recess of a part to be connected.

According to a further aspect of the invention, at least the first half or the second half may include a flattened portion at the center of the connecting member. This allows the respective half to be inserted into the recess of a part to be connected and to form a smooth and, where appropriate, sealing edge at the center of the connecting member.

According to a further aspect of the invention, the last ramp portion of the first half and the last ramp portion of the second half, i.e. those ramp portions meeting at the center of the connecting member, may widen to a different extent toward the center. Thereby, a step is formed exactly at the center between the two ramp portions. If the connecting member is now inserted into the recess of a part to be connected with its thinner end first, it can only be inserted as far as the step. This practically enables self-adjustment of the connecting member and thus of the connection exactly along the center.

The ramp portions of the connecting member are preferably formed so as to allow them to be compressed upon insertion into a recess of a part to be connected. Hence, an even stronger retention force is produced.

According to requirements, the connecting member may be made from different materials such as plastics, ceramics, metals, non-ferrous materials etc. Advantageously, it may also be made of steel enabling a simpler manufacture.

The present invention also relates to a seat belt buckle using a connecting member according to the aspects set out above. For instance, a first shell and a second shell of the seat belt buckle are connected by means of an inventive connecting member. The connecting technique using an inventive connecting member is particularly advantageous in the case of seat belt buckles typically consisting of two or more plastic shells that are to be connected so as to form a housing of the seat belt buckle.

The present invention likewise concerns a method for connecting two parts. According to the inventive method, a first recess is formed in a first part. A second recess is formed in a second part. Then the connecting member according to the aspects of the invention set out above is inserted into the first recess or, where appropriate, pressed into it. Next, the second part is positioned and advanced toward the first part such that the connecting member is also inserted or, where appropriate, pressed into the second recess. Thus, a fixed connection between the two parts is established. Advantageously, the recesses may be slightly smaller than a maximum outer diameter or a maximum outer dimension of the connecting member. The ends of the ramp portions penetrate into the walls of the housing parts defining the recesses, while elastically or plastically deforming the walls.

It may be advantageous to at least partially injection-mould around the connecting member as insert prior to its insertion into the first or second recess. Thereby, strength of the connection can be increased further.

BRIEF DESCRIPTION OF THE DRAWINGS

Further aspects of the invention will be apparent from the following description of preferred embodiments, with particular reference to the accompanying drawings, in which.

DESCRIPTION OF EXAMPLE EMBODIMENTS

Figure 1:
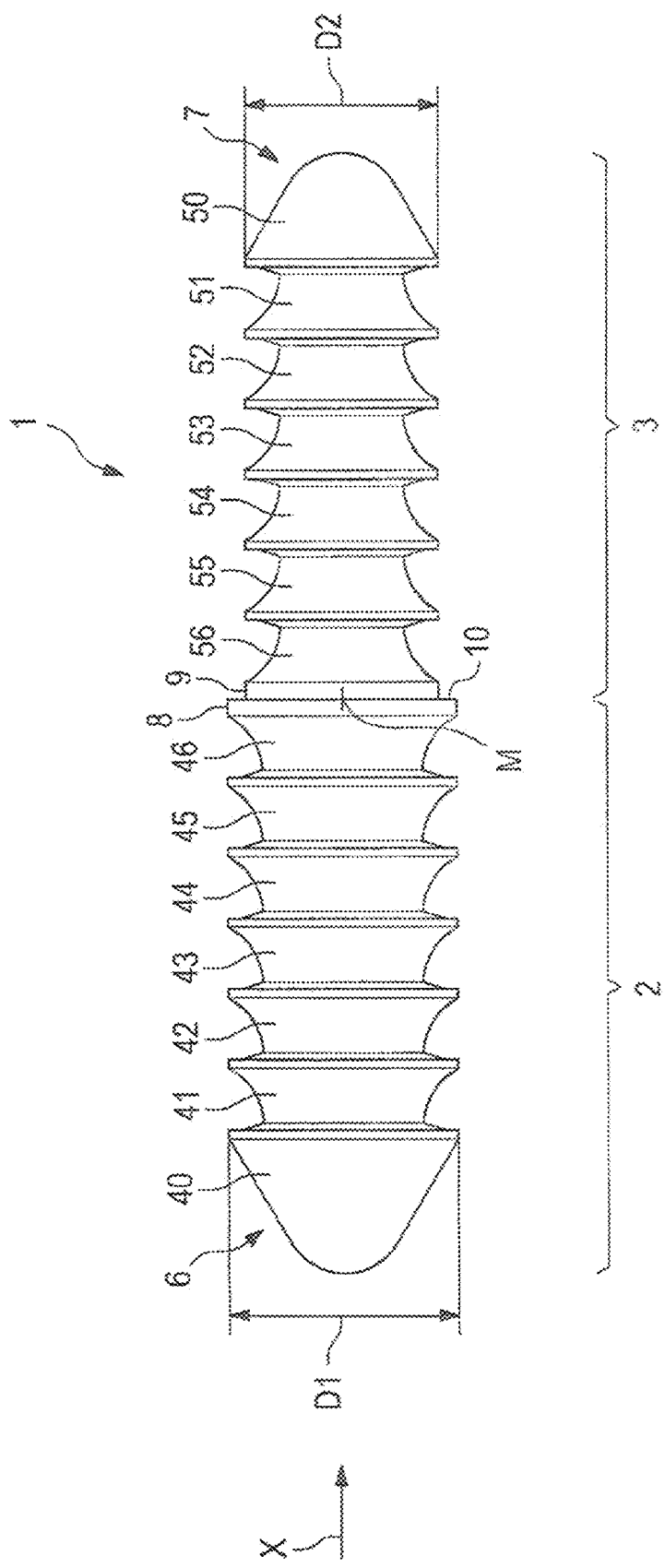
FIG. 1 is an embodiment of a connecting member according to the present invention.

FIG. 1 depicts a connecting member 1 according to a preferred embodiment of the present invention. The connecting member 1 is elongate in an axial direction X, quasi cone-shaped. Moreover, the connecting member 1 has a round cross-section and comprises a first half 2 and a second half 3. The first half 2 includes a number of ramp-like portions 40, 41, 42, 43, 44, 45, 46. In the present example, the ramp-like portions 41 to 45 are all formed basically identically. In other embodiments, however, the ramp portions may also vary significantly.

Each ramp-like portion 41 to 45 widens toward center M of the connecting member 1, i.e. its diameter increases toward center M. Center M of the connecting member 1 is that area where the first half 2 and the second half 3 are joined together or meet. Thus, depending on the respective embodiment, the distances between center M and the respective opposite ends 6,7 of the two halves 2, 3 are not necessarily of the same length.

Just as the first half 2 also the second half 3 includes a number of ramp-like portions 50 to 56. Also ramp portions 51 to 55 are all formed basically identically. They likewise widen toward center M. This results in an opposite toothing of the two halves 2, 3 of the connecting member 1. The largest diameter D2 of the ramp-like portions 50 to 56 is smaller than the largest diameter D1 of the ramp-like portions 40 to 46 of the first half 2.

The connecting member 1 comprises a first conical free end 6 at the first half 2 and a second conical free end 7 at the end of the second half 3. The conical ends 6, 7 enable easier insertion of the connecting member into recesses of parts to be connected.

At center M the final or last ramp portion 46 and 56 of the first half 2 and the second half 3 of the connecting member 1, respectively, additionally comprise slightly flattened portions 8 and 9. These flattened portions 8 and 9 allow for a smooth edge and a centering upon insertion of the connecting member 1 into a recess of a part to be connected. If halves 2, 3 have different diameters D1, D2 and the last ramp portions 46 and 56 also widen to a different extent, a step 10 is formed exactly at center M. Thereby, the insertion depth of the respective thinner half (here 3) of the connecting member 1 may be limited, thus simplifying connection and causing self-adjustment. The parts to be connected into which the connecting member 1 is inserted always meet in a form-locking manner at center M of the connecting member 1 making use of step 10.

Advantageously, the ramp portions of the connecting member 1 may widen toward center M with increasing inclination. This results in a "fir-tree-like" profile of the ramp portion which, if a flexible material is chosen for connecting member 1, allows for compression of the outermost circumference of a ramp portion or for the outer circumference to dig into the part to be connected, thus permitting a press connection between the connecting member 1 and the housing part to be connected. This enhances strength of the connection.

Figure 2:
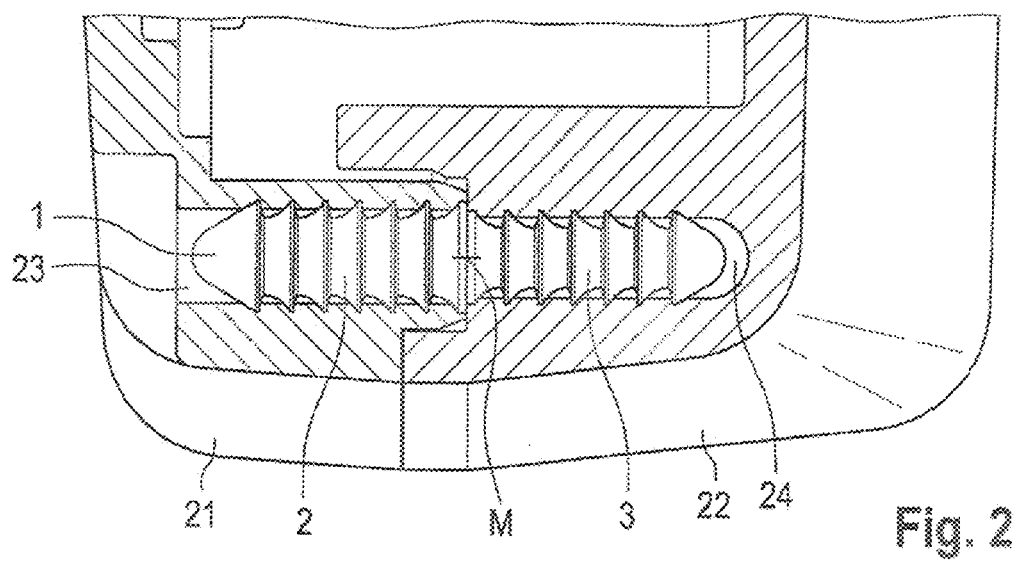
FIG. 2 is a sectional view of a connection using a connecting member according to the present invention.

FIG. 2 shows a sectional view of a housing including a first part 21 and a second part 22 connected by means of a connecting member 1 according to the invention. The first housing part 1 includes a recess 23 into which the first half 2 of the inventive connecting member 1 is inserted. The second housing part 22 includes a recess 24 into which the second half 3 of the connecting member 1 according the invention is inserted. The recesses 23, 24 may for instance consist of blind holes of limited depth suitable for entirely receiving the respective half 2, 3 of the connecting member 1. The housing parts also meet in a form-locking manner at center M of the connecting member 1 where also the two halves 2, 3 of the connecting member 1 meet. The opposite toothing provided by the ramp portions of the two halves 2, 3 of the connecting member 1 produces a friction-type connection of the two housing parts 21 and 22. Preferably, the one half 2 or the other half 3 of the connecting member 1 may be injection-moulded around with a suitable material prior to insertion into the first recess 23 or the second recess 24 (or both), so that they can be inserted as insert into recess 23, 24. This helps to avoid greater forces upon insertion or pressing. The moulding material then creates a fixed connection between the housing part and the half of the connecting member 1. The ends of the ramp portions penetrate into the walls of the housing parts 21, 22 defining the openings 23, 24 while elastically or plastically deforming the walls.

Figure 3:
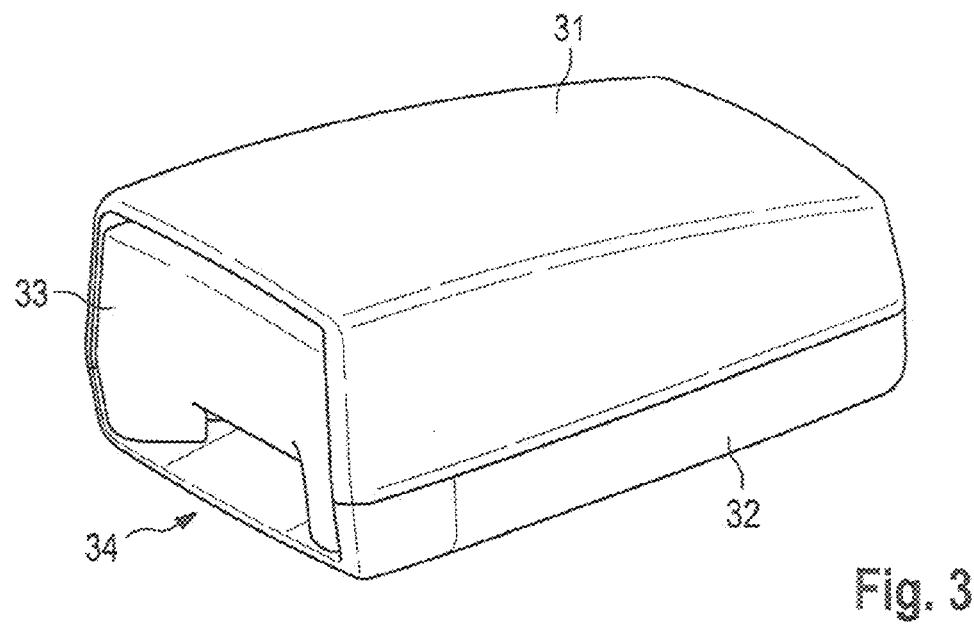
FIG. 3 represents a seat belt buckle comprising two shells connected using the connecting technique according to the present invention.

FIG. 3 shows a seat belt buckle 30 comprising two housing parts 31 and 32. Inside, it comprises a further housing part 33. The housing parts 31 and 32 are connected using connecting members and a connecting technique according to the present invention. In particular due to the specific shape of a seat belt buckle, the present invention is particularly suited for fixedly connecting the housing parts 31 and 32 to each other. The plug-in opening 34 is provided for receiving the insertion tongue of a safety belt of a motor vehicle.

Figure 4:
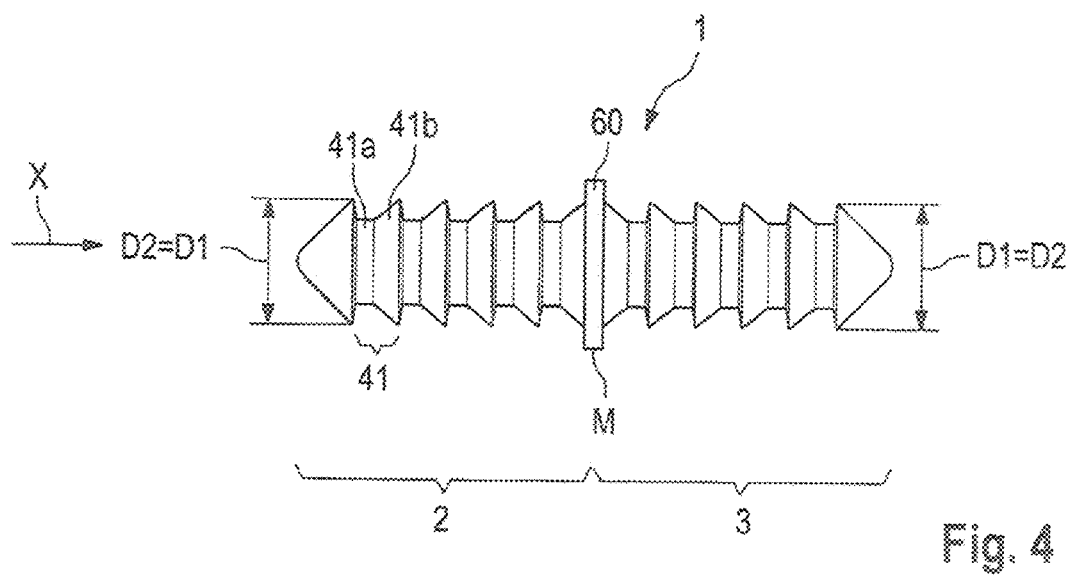
FIG. 4 represents a further embodiment of a connecting member according to the present invention.

FIG. 4 shows a connecting member 1 according to a further preferred embodiment of the present invention. The connecting member 1 according to this embodiment of the invention slightly differs from the embodiment shown in FIG. 1. It is elongate in the axial direction X, quasi cone-shaped. Moreover, it has a round cross-section and comprises a first half 2 and a second half 3. The first half 2 includes a number of ramp-like portions. In the present example, the ramp-like portions are all basically formed identically.

In contrast to the first embodiment according to FIG. 1, the largest diameters D2 of the ramp-like portions of the second half 3 are equally large as the largest diameter D1 of the ramp-like portions of the first half 2.

The connecting member 1 exhibits conical free ends with rounded points.

As diameters D1, D2 are of the same size, no step is formed at center M but a uniform central section 60. This section may have a larger outer diameter than diameters D1 and D2 of the ramp portions of the first and/or second half and thus serve as stop for setting the insertion depth, facilitating connection and also causing self-adjustment. Hence, the parts to be connected into which the connecting member 1 is inserted always meet in a form-locking manner at the central section 60 of the connecting member 1 making use of the central section 60.

The ramp portions do no longer continuously widen as shown in FIG. 1 but comprise two sections identified by way of example in ramp portion 41 as parallel section 41a and widening section 41b. This embodiment deviating from the embodiment shown in FIG. 1 can facilitate manufacture. In the parallel section 41a, the ramp portions do not widen toward center M, whereas in the widening section 41b the ramp portions widen toward center M. The ramp portions thus include at least one section where they do not widen toward center M. In the other section 41b the ramp portion may widen continuously. Hence, if the connecting member has a round cross-section, these portions have a conical shape in sections.

Figure 5:
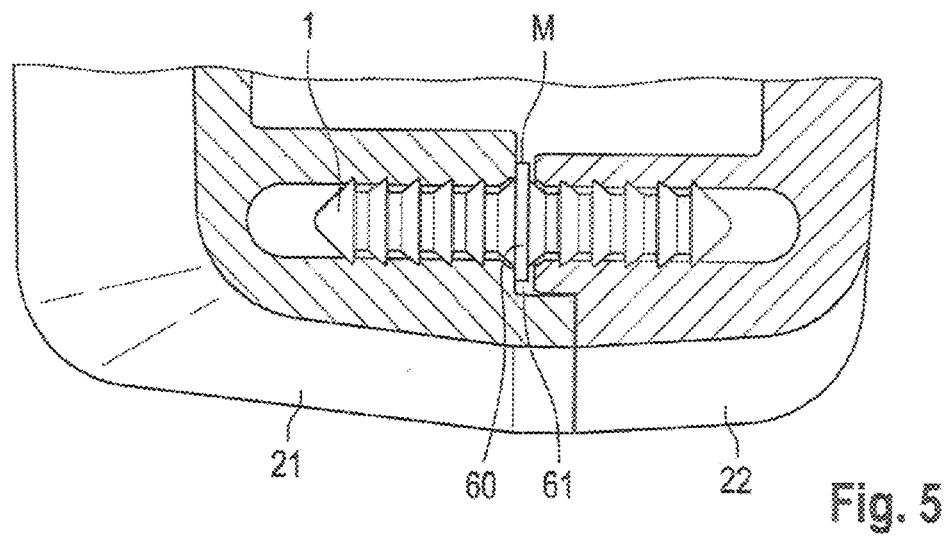
FIG. 5 represents a sectional view of a connection using a connecting member according to the embodiment of FIG. 4.

FIG. 5 is a sectional view of a housing comprising a first part 21 and a second part 22 connected by means of an inventive connecting member 1 according to the second embodiment shown in FIG. 4. This embodiment of the connection basically corresponds to that of FIG. 2, the connecting member 1 now having identical outer diameters D1 and D2 (cf. FIG. 4). Here, the central section 60 now serves as stop for one or both housing parts 21 and 22. So as to achieve a form-locking connection, a recess 61 is provided in at least one housing part 21, 22 which is deep enough to at least receive half of the central section 60. Advantageously, the recess 61 may, on one side or on both sides (i.e. either in housing part 21 or in housing part 22 or in both housing parts), be slightly deeper than half or the entire thickness of the central section 60.

The invention claimed is:

1. A connecting member for two parts comprising a first half (2) and a second half (3) meeting at a center (M) of said connecting member (1), wherein, in an axial direction (X) thereof, said first half (2) includes a first number of ramp portions (41-45) widening toward center (M) and said second half (3), in an axial direction (X) thereof, includes a second number of ramp portions (51-55) widening toward center (M) so that said first half (2) and said second half (3) have opposite toothing, the first half (2) being inserted into a recess (23) in a first part (21) and the second half (3) being inserted into a recess (24) in a second part (22), all of the ramp portions (41-45) of the first half (2) engaging the first part (21) and all of the ramp portions (51-55) of the second half (3) engaging the second part (22) to connect the first part (21) to the second part (22), the first and second parts being part of a seat belt buckle.

2. The connecting member according to claim 1, wherein said ramp portions (41-45) of said first half (2) at least partly widen to a greater extent than said ramp portions (51-55) of said second half (3).

3. The connecting member according to claim 1, wherein a cross-sectional surface of said first and/or said second half (2, 3) is rectangular, round or circular.

4. The connecting member according to claim 1, characterized in that it is elongate and/or has a conical shape.

5. The connecting member according to claim 1, wherein at least said first half (2) and/or said second half (3) exhibits a conical free end (6, 7).

6. The connecting member according to claim 1, wherein at least said first half (2) and/or said second half (3) comprises a flattened portion (8, 9) at center (M).

7. The connecting member according to claim 1, wherein a ramp portion (46) of said first half (2) and a ramp portion (56) of said second half (3) respectively meeting at center (M) of said connecting member widen to a different extent toward center (M) such that a step (10) is formed along center (M).

8. The connecting member according to claim 1, characterized in that it is made of steel.

9. The connecting member according to claim 1, wherein each ramp portion of at least one of the first half and the second half includes a parallel section and a widening section that extends radially outward of the parallel section.

10. The connecting member according to claim 9, wherein each parallel section includes a surface that extends parallel to the axial direction, the widening section extending radially outward from the surface of the parallel section.

11. The connecting member according to claim 1, wherein the first part and the second part are connected by a central section, the central section having a diameter that is greater than a largest diameter of the ramp portions of the first part.

12. The connecting member according to claim 11, wherein the diameter of the central section is greater than a largest diameter of the ramp portions of the second part.

13. The connecting member according to claim 1, wherein both the ramp portions of the first part and the ramp portions of the second part each include a parallel section and a widening section that extends radially outward of the parallel section.

14. The connecting member according to claim 1, wherein the center is rigid.

15. A seat belt buckle comprising a connecting member (1) having a first half (2) and a second half (3) meeting at a center (M) of said connecting member (1), wherein, in an axial direction (X) thereof, said first half (2) includes a first number of ramp portions (41-45) widening toward center (M) and said second half (3), in an axial direction (X) thereof, includes a second number of ramp portions (51-55) widening toward center (M) so that said first half (2) and said second half (3) have opposite toothing, the first half (2) being inserted into a recess (23) in a first part (21) of the seat belt buckle and the second half (3) being inserted into a recess (24) in a second part (22) of the seat belt buckle, all of the ramp portions (41-45) of the first half (2) engaging the first part (21) and all of the ramp portions (51-55) of the second half (3) engaging the second part (22) to connect the first part (21) to the second part (22).

16. The seat belt buckle connecting member according to claim 15, wherein said seat belt buckle includes a first shell (31) and a second shell (32) connected by means of said connecting member (1).

17. The connecting member according to claim 15, wherein the seat belt buckle comprises a first housing part and a second housing part, the first half of the connecting member being inserted into a recess in the first housing part and the second half being inserted into a recess in the second housing part, the ramp portions of the first half engaging the first housing part and the ramp portions of the second half engaging the second housing part to connect the first housing part to the second housing part.

18. The connecting member according to claim 17, wherein the first housing part and the second housing part meet at the center of the connecting member.

19. The connecting member according to claim 17, wherein the ramp portions of the first half engage only the first housing part and the ramp portions of the second half engage only the second housing part.

* * * * *